(12) United States Patent
Deng et al.

(10) Patent No.: US 12,398,055 B2
(45) Date of Patent: Aug. 26, 2025

(54) MICRON IRON-BASED PRIMARY BATTERY MATERIAL, PREPARATION METHOD AND MEMBRANE BIOREACTOR SYSTEM

(71) Applicant: Xi'an Jiaotong University, Xi'an (CN)

(72) Inventors: Shihai Deng, Xi'an (CN); Ying Chen, Xi'an (CN); Zhaoxu Li, Xi'an (CN); Xiaoke Zhang, Xi'an (CN); Pengkang Jin, Xi'an (CN)

(73) Assignee: XI'AN JIAOTONG UNIVERSITY, Xi'an (CN)

( * ) Notice: Subject to any disclaimer, the term of this patent is extended or adjusted under 35 U.S.C. 154(b) by 0 days.

(21) Appl. No.: 19/006,778

(22) Filed: Dec. 31, 2024

(65) Prior Publication Data

US 2025/0230079 A1    Jul. 17, 2025

(30) Foreign Application Priority Data

Jan. 12, 2024    (CN) .......................... 202410049333.7

(51) Int. Cl.
*C02F 3/12*    (2023.01)

(52) U.S. Cl.
CPC ........ *C02F 3/1268* (2013.01); *C02F 2203/00* (2013.01); *C02F 2209/06* (2013.01); *C02F 2209/10* (2013.01); *C02F 2209/22* (2013.01); *C02F 2209/42* (2013.01); *C02F 2209/44* (2013.01)

(58) Field of Classification Search
CPC .......................... C02F 3/1268; C02F 3/12–26
See application file for complete search history.

(56) References Cited

U.S. PATENT DOCUMENTS

| | | | |
|---|---|---|---|
| 10,626,264 B2 * | 4/2020 | Ito | H01M 4/66 |
| 2010/0264082 A1 | 10/2010 | Conner | |
| 2015/0329394 A1 * | 11/2015 | Wang et al. | C02F 3/30 |
| | | | 210/209 |

FOREIGN PATENT DOCUMENTS

| | | | | |
|---|---|---|---|---|
| CN | 101952209 A | | 1/2011 | |
| CN | 104903257 A | | 12/2018 | |
| CN | 110841639 A | * | 2/2020 | |
| CN | 111097414 B | * | 10/2021 | B01J 20/02 |
| CN | 114405492 A | | 4/2022 | |
| CN | 114477417 A | | 5/2022 | |

(Continued)

OTHER PUBLICATIONS

Fan. Machine translation of CN110841639. Feb. 28, 2020 (Year: 2020).*

(Continued)

*Primary Examiner* — Matthew E. Hoban
(74) *Attorney, Agent, or Firm* — Pilloff Passino & Cosenza LLP; Rachel Pilloff; Sean Passino

(57) ABSTRACT

A micron iron-based primary battery material, preparation method and membrane bioreactor system are provided. The raw materials of the primary battery material include micron zero-valent iron particles and micron activated carbon particles, and the primary battery material is spherical particles with a BET specific surface area of 32-110 m²/g and a particle size of 15-25 mm; the method includes the following steps: loading micron zero-valent iron particles on the surface of micron activated carbon particles by using the bonding effect of a bonding agent, stirring, granulating and drying to obtain the product.

3 Claims, 1 Drawing Sheet

(56) References Cited

FOREIGN PATENT DOCUMENTS

| | | | |
|---|---|---|---|
| CN | 115385436 A | | 11/2022 |
| CN | 116693045 A | | 9/2023 |
| JP | 2020054990 A | * | 4/2020 |

OTHER PUBLICATIONS

Cai. Machine translation of CN-111097414-B. Oct. 15, 2021 (Year: 2021).*

Yamada. Machine translation of JP-2020054990-A. Apr. 9, 2020 (Year: 2020).*

Guo Yong, et al., The Characteristics of Particle Biofilm Sequencing Batch MBR for Wastewater Treatment Journal of Sichuan University (Engineering Science Edition), Jul. 31, 2008, pp. 66-70, 76, vol. 40, No. 4; doi: 10.15961/j.jsuese.2008.04.002.

Yifu Zhang, et al., Bamboo Leaves as Sustainable Sources for the Preparation of Amorphous Carbon/Iron Silicate Anode and Nickel-Cobalt Silicate Cathode Materials for Hybrid Supercapacitors, ACS Appl. Energy Mater. Sep. 2, 2021, 4, 9328-9340 doi: 10.1021/acsaem.1c01540 Full text; Claims involved: 1-8.

Xiaorui Ahang, et al., Synergistic effects of iron (Fe) and biochar on light-weight geopolymers when used in wastewater treatment applications, Journal of Cleaner Production, Sep. 16, 2021, vol. 322, No. 129033 doi: 10.1016/j.jclepro.2021.129033 Full text; Claims involved: 1-8.

Liu Qing-Hui, et al., Research in COD treatment technology of Printed Circuit Board wastewater, Printed Circuit Information, 2014, pp. 54-58, No. 7.

Retrieval report—First search dated Jul. 5, 2024 in SIPO application No. 202410049333.7.

Notification to Grant Patent Right for Invention dated Jul. 15, 2024 in SIPO application No. 202410049333.7.

* cited by examiner

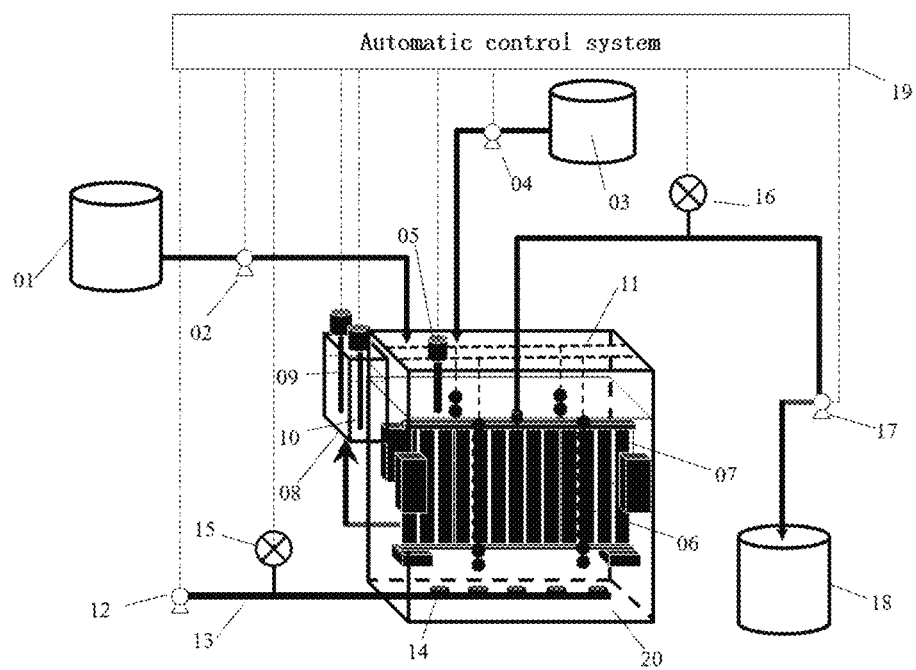

MICRON IRON-BASED PRIMARY BATTERY MATERIAL, PREPARATION METHOD AND MEMBRANE BIOREACTOR SYSTEM

CROSS-REFERENCE TO RELATED APPLICATIONS

This application claims priority to Chinese Patent Application No. 202410049333.7, filed on Jan. 12, 2024, the contents of which are hereby incorporated by reference.

TECHNICAL FIELD

The application relates to the technical field of industrial wastewater treatment, in particular to a micron iron-based primary battery material, a preparation method and a membrane bioreactor system.

BACKGROUND

Membrane bioreactor (MBR) is a new biotechnology for wastewater treatment. MBR realizes the separation of hydraulic retention time and sludge retention time, and reaches high mixed liquid suspended solids. Compared with traditional biological treatment process, MBR has the advantages of high removal loads, low sludge output, high resistance to impact loads and small area occupancy. Studies have proven that MBR has better organic matter removal performance than traditional activated sludge treatment processes in treating industrial wastewater such as semi-coke wastewater and coking wastewater. However, in treating industrial wastewater, due to the low biodegradability, biological inhibition and biotoxicity of some organic substances in wastewater, the capability of removing organic substances of MBR is prohibited, and the membrane fouling of MBR is aggravated.

Guo Yong et al. (Guo Yong, Li Li, Chen Wenqing, Yang Ping. Study on Wastewater Treatment Characteristics of Granular Biofilm Sequencing Batch MBR [J]. *Journal of Sichuan University* (Engineering Science Edition), 2008, 40 (4): 66-70.) propose to treat chemical wastewater by sequencing batch membrane bioreactor with porous polymer carriers, and investigate the pollutant removal effect of the system and the factors affecting membrane fouling. However, due to the low efficiency of adding materials, the COD removal rate is low and the MBR membrane fouling cycle is short.

China invention application with the publication number CN101952209A provides a suspended medium granular activated carbon membrane bioreactor system and method, in which granular activated carbon is introduced into the aeration part of the membrane bioreactor and maintained at the upstream of the membrane operation system, thus avoiding the membrane from being worn by carbon particles. However, because the material is only used to prevent membrane damage, the system has the disadvantages like a low COD removal rate and inability to alleviate membrane fouling.

Liu Qinghui et al. (Liu Qinghui, Jin Hongjian. Discussion on COD Wastewater Treatment Technology of Printed Circuit Board [J]. *Printed Circuit Information*, 2014, (7): 54-58.) propose iron-carbon micro-electrolysis+anaerobic/anoxic/aerobic biochemical treatment+membrane bioreactor to treat printed circuit board wastewater, and investigate the pollutant removal effect of the system and the factors affecting membrane fouling. However, due to the complex treatment process and the non-optimized membrane bioreactor, the technical scheme proposed by Liu Qinghui et al. has the disadvantages of difficult operation, a low COD removal rate, serious membrane fouling and frequent membrane cleaning and replacement.

China invention with post-grant publication number CN104903257B provides the use of activated carbon in membrane bioreactor. A supply unit feeds adsorbent such as powdered activated carbon (PAC) to MBR, and adsorbent particles exist in the mixed liquid and contact with the membrane to treat sewage. However, the membrane bioreactor has the disadvantages of high costs and a short membrane service life, because the material will cause membrane wear and fouling.

SUMMARY

In order to overcome the shortcomings of the prior art, the purpose of the present application is to provide a micron iron-based primary battery material, a preparation method and a membrane bioreactor system. By using the formation process of calcium hydroxide (Ca—H) crystal and calcium silicate hydrate (Ca—Si—H) crystal, micron zero-valent iron particles are loaded on the surface of micron activated carbon particles to obtain Micro-ZVI@GACs spherical particles; in order to solve the technical problems of low removal rates of toxic organic compounds in industrial wastewater, serious membrane fouling and frequent membrane cleaning and replacement in the prior art, Micro-ZVI@GACs spherical particles as micron iron-based primary battery materials are coupled with the membrane bioreactor system in situ; the application has the characteristics of a simple preparation method, low energy consumption and easy productization; micron iron-based primary battery materials are applied to the membrane bioreactor system, which has the characteristics of high treatment efficiency, strong organic degradation abilities and long membrane fouling cycle, and is easy to be popularized and applied.

In order to achieve the purposes above, the technical schemes adopted are as follows.

A micron iron-based primary battery material includes micron zero-valent iron particles and micron activated carbon particles as raw materials, where the primary battery material is spherical particles, and the BET (Brunauer, Emmett and Teller) specific surface area of the spherical particles is 32-110 $m^2/g$, and the particle size is 15-25 mm;

A preparation method of micron iron-based primary battery material includes: loading micron zero-valent iron particles on the surface of micron activated carbon particles by bonding agents, stirring, granulating and drying to obtain Micron-ZVI@GACs spherical particles, that is, the micron iron-based primary battery material.

The bonding agents include a first bonding agent and a second bonding agent. The first bonding agent is one or two among sodium silicate and sodium metasilicate, the second bonding agent is one or two among calcium hydroxide and calcium carbonate, and when there are two bonding agents, the ratio between the two is any value.

According to the mass volume ratio, micron zero-valent iron particles:micron activated carbon particles:a first bonding agent:a second bonding agent:deionized water=350-450 g/kg: 350-450 g/kg: 50-150 g/kg: 50-150 g/kg: 200 mL/kg.

The stirring speed is 80-120 r/min and the duration is 5-9 min; the drying temperature is 50-60° C. and the drying duration is 8-12 h.

A membrane bioreactor system includes the micron iron-based primary battery material 6 as described above, or the micron iron-based primary battery material 6 prepared by the preparation method of the micron iron-based primary battery material as described above, where the micron iron-based primary battery material 6 is arranged in an MBR reaction tank 20; a membrane module 7 perpendicular to the horizontal plane is arranged in the MBR reaction tank 20, and the water outlet pipe of the membrane module 7 is communicated with the water inlet pipe of the water outlet tank 18, and the water inlet pipe of the MBR reaction tank 20 is communicated with the water outlet pipe of the water inlet tank 1.

The system further includes a liquid level controller 8 arranged on the top side wall of the MBR reaction tank 20, a pH electrode 5 arranged inside the MBR reaction tank 20, a medicament tank 3 and a blower 12; the liquid level controller 8 includes a high liquid level sensor 9 and a low liquid level sensor 10, and the water inlet pipe of the liquid level controller 8 is communicated with the water outlet pipe of the MBR reaction tank 20; the water outlet pipe of the medicament tank 3 and a pH control pump 4 is communicated with the water inlet pipe, and the water outlet pipe of the pH control pump 4 is communicated with the water inlet pipe of the MBR reaction tank 20; the air outlet pipe of the blower 12 is communicated with one end of the air distribution pipe 13, the other end of the air distribution pipe 13 extends into the MBR reaction tank 20, the top of the extended pipeline of the air distribution pipe 13 is provided with a plurality of air distribution nozzles 14, and the pipeline of the air distribution pipe 13 close to the blower 12 is provided with a first gas flowmeter 15.

A water inlet pump 2 is arranged at the water outlet end of the water inlet tank 1; the water inlet end of the water outlet tank 18 is provided with a suction pump 17, and the water inlet line of the suction pump 17 is provided with a second gas flowmeter 16.

The system further includes an automatic control system 19, the signal output ends of the pH electrode 5, the high liquid level sensor 9, the low liquid level sensor 10, the first gas flowmeter 15 and the second gas flowmeter 16 are all connected with the signal input end of the automatic control system 19; the signal output end of the automatic control system 19 is respectively connected with the signal input ends of the pH control pump 4, the water inlet pump 2, the blower 12 and the suction pump 17.

The optimal operating conditions of the system are: hydraulic retention time (HRT) is 8-24 h, sludge retention time (SRT) is 5-10 d, dissolved oxygen (DO) is 3-3.5 mg/L, pH value of liquid in MBR reaction tank 20 is 8-8.5, and mixed liquid suspended solids (MLSS) is 9.2-11.1 g/L.

Compared with the prior art, the application has the following beneficial effects.

1. The application uses the formation process of calcium hydroxide (Ca—H) crystal and calcium silicate hydrate (Ca—Si—H) crystal to load micron zero-valent iron particles on the surface of micron activated carbon particles to obtain Micro-ZVI@GACs spherical particles, the specific surface area of which is twice that of conventional primary battery materials, and the reaction efficiency is significantly improved.

2. Micro-ZVI@GACs spherical particles as micron iron-based primary battery materials prepared by the application are added into a membrane bioreactor system, and zero-valent iron and activated carbon spontaneously react in an aqueous solution to form numerous "primary batteries", so that the technical problem that industrial wastewater with high concentration of refractory organic compounds cannot be efficiently treated by the existing process is solved through the combined action of chemical reaction and biological coupling; compared with the prior art, the chemical oxygen demand (COD), total organic carbon (TOC) and the degradation rate of toxic phenolic organics (PHENs) are increased by 18.2%, 21.7% and 17.0% respectively, which enhance the biological activity, reduce the biological toxicity of industrial wastewater and significantly improve the organic degradation abilities of MBR system.

3. The Micro-ZVI@GVCs spherical particles prepared by the application may release $Fe^{3+}$, which leads to the coagulation of $Fe(OH)_3$ and FeOOH, so the size of sludge flocs is significantly increased, and the membrane fouling is slowed down. At the same time, the released $Fe^{3+}$ may inhibit the secretion of main membrane pollutants SMP and EPS protein, and the membrane fouling period is slowed down by 71.2%, which significantly prolongs the membrane fouling period.

In summary, the application solve the technical problems of low removal rates of toxic organic matters in industrial wastewater, serious membrane fouling, and frequent membrane cleaning and replacement in the prior art by coupling the prepared Micro-ZVI@GACs spherical particles as the micron iron-based primary cell material with the membrane bioreactor system in situ. The application has the characteristics of simple material preparation method, low energy consumption and easy productization; micron iron-based primary battery materials are applied to the membrane bioreactor system, which has the characteristics of high treatment efficiency, strong organic degradation ability and long membrane fouling periods, and easy application.

BRIEF DESCRIPTION OF THE DRAWING

The FIGURE is a schematic structural diagram of a membrane bioreactor system of the present application.

DETAILED DESCRIPTION OF THE EMBODIMENTS

The technical schemes of the present application will be further described with reference to the FIGURE and embodiments.

The raw materials of a micron iron-based primary battery material include micron zero-valent iron particles and micron activated carbon particles, and the primary battery material is spherical particles with a BET specific surface area of 32-110 $m^2/g$, a packing density of 1.5-2.3 $g/cm^3$, a compressive strength of 1.3-3.3 MPa and a particle size of 15-25 mm.

A preparation method of micron iron-based primary battery material includes the following steps:

Step 1: putting micron zero-valent iron particles (Micro-ZVI), micron activated carbon particles (Micro-GAC), bonding agent and tap water in a horizontal U-shaped mixer, mixing and stirring at 80-120 r/min for 5-9 min, and loading the micron zero-valent iron particles on the surface of the micron activated carbon particles by the bonding effect formed by crystals in the bonding agents to obtain a material composite; the bonding agents includes a first bonding agent and a second bonding agent, the first bonding agent is one or two among sodium silicate and sodium metasilicate, the second bonding agent is one or two among calcium hydroxide and calcium carbonate, and when there are two bonding agents, the ratio between the two is any value; according to the mass volume ratio, micron zero-valent iron particles:micron activated carbon particles:first bonding agent:second bonding agent:deionized water=350-450 g/kg: 350-450 g/kg: 50-150 g/kg: 50-150 g/kg: 200 mL/kg;

the purity of the micron zero-valent iron particles is more than 90%, and the particle size is 15-25 μm; the specific surface area of micron activated carbon particles is more than 800 m$^2$/g, and the particle size is 50-100 μm; the power of the horizontal U-shaped mixer is 5-10 kW;

Step 2: granulating the material composite in the Step 1 with a roller granulator at room temperature to obtain Micro-ZVI@GACs spherical particles with a particle size of 15-25 mm; the Micro-ZVI@GACs spherical particles are placed in an oven and dried at 50-60° C. for 8-12 h; and the power of the roller granulator is 10-20 kW.

Embodiment 1

The raw materials of a micron iron-based primary battery material include micron zero-valent iron particles and micron activated carbon particles, and the primary battery material is spherical particles with a BET specific surface area of 85.7 m$^2$/g, a packing density of 1.82 g/cm$^3$, a compressive strength of 2.0 MPa and a particle size of 15-25 mm.

A preparation method of micron iron-based primary battery material includes the following steps:

Step 1: putting micron zero-valent iron particles (Micro-ZVI), micron activated carbon particles (Micro-GAC), bonding agent and tap water in a horizontal U-shaped mixer, mixing and stirring at 100 r/min for 7 min, and loading the micron zero-valent iron particles on the surface of the micron activated carbon particles by the bonding effect formed by crystals in the bonding agent to obtain a material composite; the bonding agents include a first bonding agent and a second bonding agent, the first bonding agent is one or two among sodium silicate and sodium metasilicate, the second bonding agent is one or two among calcium hydroxide and calcium carbonate, and when the bonding agents are two, the ratio between the two is any value; according to the mass volume ratio, micron zero-valent iron particles:micron activated carbon particles:first bonding agent:second bonding agent:deionized water=400 g/kg: 400 g/kg: 100 g/kg:100 g/kg: 200 mL/kg; the first bonding agent is a mixture of sodium silicate and sodium metasilicate, and the mass ratio of the sodium silicate to the sodium metasilicate is 1:1; the second bonding agent is a mixture of calcium hydroxide and calcium carbonate, and the mass ratio of the calcium hydroxide to the calcium carbonate is 1:1;

Step 2: granulating the material composite in the Step 1 with a roller granulator at room temperature to obtain Micro-ZVI@GACs spherical particles with a particle size of 15-25 mm; the Micro-ZVI@GACs spherical particles are placed in the oven and dried at 50° C. for 10 h.

Embodiment 2

The raw materials of a micron iron-based primary battery material include micron zero-valent iron particles and micron activated carbon particles, and the primary battery material is spherical particles with a BET specific surface area of 62.3 m$^2$/g, a packing density of 1.89 g/cm$^3$, a compressive strength of 2.4 MPa and a particle size of 15-25 mm.

A preparation method of micron iron-based primary battery material includes the following steps:

Step 1: putting micron zero-valent iron particles (Micro-ZVI), micron activated carbon particles (Micro-GAC), bonding agent and tap water in a horizontal U-shaped mixer, mixing and stirring at 80 r/min for 9 min, and loading the micron zero-valent iron particles on the surface of the micron activated carbon particles by the bonding effect formed by crystals in the bonding agent to obtain a material composite; the bonding agents include a first bonding agent and a second bonding agent, the first bonding agent is one or two among sodium silicate and sodium metasilicate, the second bonding agent is one or two among calcium hydroxide and calcium carbonate, and when the bonding agents are two, the ratio between the two is any value; according to the mass volume ratio, micron zero-valent iron particles:micron activated carbon particles:first bonding agent:second bonding agent:deionized water=400 g/kg: 400 g/kg: 150 g/kg: 50 g/kg: 200 mL/kg; the first bonding agent is a mixture of sodium silicate and sodium metasilicate, and the mass ratio of the sodium silicate to the sodium metasilicate is 1:1; the second bonding agent is a mixture of calcium hydroxide and calcium carbonate, and the mass ratio of the calcium hydroxide to the calcium carbonate is 1:1;

Step 2: granulating the material composite in the Step 1 with a roller granulator at room temperature to obtain Micro-ZVI@GACs spherical particles with a particle size of 15-25 mm; the Micro-ZVI@GACs spherical particles are placed in the oven and dried at 60° C. for 8 h.

Embodiment 3

The raw materials of a micron iron-based primary battery material include micron zero-valent iron particles and micron activated carbon particles, and the primary battery material is spherical particles with a BET specific surface area of 92.9 m$^2$/g, a packing density of 1.88 g/cm$^3$, a compressive strength of 1.6 MPa and a particle size of 15-25 mm.

A preparation method of micron iron-based primary battery material includes the following steps:

Step 1: putting micron zero-valent iron particles (Micro-ZVI), micron activated carbon particles (Micro-GAC), bonding agent and tap water in a horizontal U-shaped mixer, mixing and stirring at 120 r/min for 5 min, and loading the micron zero-valent iron particles on the surface of the micron activated carbon particles by the bonding effect formed by crystals in the bonding agent to obtain a material composite; the bonding agents include a first bonding agent and a second bonding agent, the first bonding agent is one or two among sodium silicate and sodium metasilicate, the second bonding agent is one or two among calcium hydroxide and calcium carbonate, and when there are two bonding agents, the ratio between the two is any value; according to the mass volume ratio, micron zero-valent iron particles:micron activated carbon particles:first bonding agent:second bonding agent:deionized water=400 g/kg: 400 g/kg: 50 g/kg: 150 g/kg: 200 mL/kg; the first bonding agent is a mixture of sodium silicate and sodium metasilicate, and the mass ratio of the sodium silicate to the sodium metasilicate is 1:1; the second bonding agent is a mixture of calcium hydroxide and calcium carbonate, and the mass ratio of the calcium hydroxide to the calcium carbonate is 1:1;

Step 2: granulating the material composite in the Step 1 with a roller granulator at room temperature to obtain Micro-ZVI@GACs spherical particles with a particle size of 15-25 mm; the Micro-ZVI@GACs spherical particles are placed in the oven and dried at 50° C. for 12 h.

Embodiment 4

The raw materials of a micron iron-based primary battery material include micron zero-valent iron particles and micron activated carbon particles, and the primary battery material is spherical particles with a BET specific surface area of 105.5 m$^2$/g, a packing density of 1.62 g/cm$^3$, a compressive strength of 1.9 MPa and a particle size of 15-25 mm.

A preparation method of micron iron-based primary battery material includes the following steps:

Step 1: putting micron zero-valent iron particles (Micro-ZVI), micron activated carbon particles (Micro-GAC), bonding agent and tap water in a horizontal U-shaped mixer, mixing and stirring at 100 r/min or 7 min, and loading the micron zero-valent iron particles on the surface of the micron activated carbon particles by the bonding effect formed by crystals in the bonding agent to obtain a material composite; the bonding agents include a first bonding agent and a second bonding agent, the first bonding agent is one or two among sodium silicate and sodium metasilicate, the second bonding agent is one or two among calcium hydroxide and calcium carbonate, and when there are two bonding agents, the proportion between the two is any value; according to the mass volume ratio, micron zero-valent iron particles:micron activated carbon particles:first bonding agent:second bonding agent:deionized water=350 g/kg: 450 g/kg: 100 g/kg: 100 g/kg: 200 mL/kg; the first bonding agent is a mixture of sodium silicate and sodium metasilicate, and the mass ratio of the sodium silicate to the sodium metasilicate is 1:1; the second bonding agent is a mixture of calcium hydroxide and calcium carbonate, and the mass ratio of the calcium hydroxide to the calcium carbonate is 1:1;

Step 2: granulating the material composite in the Step 1 with a roller granulator at room temperature to obtain Micro-ZVI@GACs spherical particles with a particle size of 15-25 mm; the Micro-ZVI@GACs spherical particles are placed in the oven and dried at 55° C. for 10 h.

Embodiment 5

The raw materials of a micron iron-based primary battery material include micron zero-valent iron particles and micron activated carbon particles, and the primary battery material is spherical particles with a BET specific surface area of 66.1 m$^2$/g, a packing density of 2.27 g/cm$^3$, a compressive strength of 2.7 MPa and a particle size of 15-25 mm.

A preparation method of micron iron-based primary battery material includes the following steps:

Step 1: putting micron zero-valent iron particles (Micro-ZVI), micron activated carbon particles (Micro-GAC), bonding agent and tap water in a horizontal U-shaped mixer, mixing and stirring at 100 r/min for 7 min, and loading the micron zero-valent iron particles on the surface of the micron activated carbon particles by the bonding effect formed by crystals in the bonding agent to obtain a material composite; the bonding agent includes a first bonding agent and a second bonding agent, the first bonding agent is one or two among sodium silicate and sodium metasilicate, the second bonding agent is one or two among calcium hydroxide and calcium carbonate, and when there are two bonding agents, the ratio between the two is any value; according to the mass volume ratio, micron zero-valent iron particles:micron activated carbon particles:first bonding agent:second bonding agent:deionized water=450 g/kg: 350 g/kg: 100 g/kg: 100 g/kg: 200 mL/kg; the first bonding agent is a mixture of sodium silicate and sodium metasilicate, and the mass ratio of the sodium silicate to the sodium metasilicate is 1:1; the second bonding agent is a mixture of calcium hydroxide and calcium carbonate, and the mass ratio of the calcium hydroxide to the calcium carbonate is 1:1;

Step 2: granulating the material composite in the Step 1 with a roller granulator at room temperature to obtain Micro-ZVI@GACs spherical particles with a particle size of 15-25 mm; the Micro-ZVI@GACs spherical particles are placed in the oven and dried at 55° C. for 10 h.

Embodiment 6

The raw materials of a micron iron-based primary battery material include micron zero-valent iron particles and micron activated carbon particles, and the primary battery material is spherical particles with a BET specific surface area of 32.8 m$^2$/g, a packing density of 1.91 g/cm$^3$, a compressive strength of 3.3 MPa and a particle size of 15-25 mm.

A preparation method of micron iron-based primary battery material includes the following steps:

Step 1: putting micron zero-valent iron particles (Micro-ZVI), micron activated carbon particles (Micro-GAC), bonding agent and tap water in a horizontal U-shaped mixer, mixing and stirring at 100 r/min for 7 min, and loading the micron zero-valent iron particles on the surface of the micron activated carbon particles by the bonding effect formed by crystals in the bonding agent to obtain a material composite; the bonding agents includes a first bonding agent and a second bonding agent, the first bonding agent is one or two among sodium silicate and sodium metasilicate, the second bonding agent is one or two among calcium hydroxide and calcium carbonate, and when there are two bonding agents, the ratio between is any value; according to the mass volume ratio, micron zero-valent iron particles: micron activated carbon particles:first bonding agent: second bonding agent:deionized water=400 g/kg: 400 g/kg: 100 g/kg: 100 g/kg: 200 mL/kg; the first bonding agent is sodium metasilicate; the second bonding agent is a mixture of calcium hydroxide and calcium carbonate, and the mass ratio of the calcium hydroxide to the calcium carbonate is 1:1;

Step 2: granulating the material composite in the Step 1 with a roller granulator at room temperature to obtain Micro-ZVI@GACs spherical particles with a particle size of 15-25 mm; the Micro-ZVI@GACs spherical particles are placed in the oven and dried at 55° C. for 10 h.

Embodiment 7

The raw materials of a micron iron-based primary battery material include micron zero-valent iron particles and micron activated carbon particles, and the primary battery material is spherical particles with a BET specific surface area of 75.5 m²/g, a packing density of 1.80 g/cm³, a compressive strength of 1.5 MPa and a particle size of 15-25 mm.

A preparation method of micron iron-based primary battery material includes the following steps:

Step 1: putting micron zero-valent iron particles (Micro-ZVI), micron activated carbon particles (Micro-GAC), bonding agent and tap water in a horizontal U-shaped mixer, mixing and stirring at 100 r/min for 7 min, and loading the micron zero-valent iron particles on the surface of the micron activated carbon particles by the bonding effect formed by crystals in the bonding agent to obtain a material composite; the bonding agent includes a first bonding agent and a second bonding agent, the first bonding agent is one or two among sodium silicate and sodium metasilicate, the second bonding agent is one or two among calcium hydroxide and calcium carbonate, and when there are two bonding agents, the ratio between the two is any value; according to the mass volume ratio, micron zero-valent iron particles:micron activated carbon particles:first bonding agent:second bonding agent:deionized water=400 g/kg: 400 g/kg: 100 g/kg: 100 g/kg: 200 mL/kg; the first bonding agent is sodium metasilicate, and the mass ratio of the sodium silicate to the sodium metasilicate is 1:1; the second bonding agent is a mixture of calcium hydroxide and calcium carbonate, and the mass ratio of the calcium hydroxide to the calcium carbonate is 1:1;

Step 2: granulating the material composite in the Step 1 with a roller granulator at room temperature to obtain Micro-ZVI@GACs spherical particles with a particle size of 15-25 mm; the Micro-ZVI@GACs spherical particles are placed in the oven and dried at 55° C. for 10 h.

Embodiment 8

The raw materials of a micron iron-based primary battery material include micron zero-valent iron particles and micron activated carbon particles, and the primary battery material is spherical particles with a BET specific surface area of 82.9 m²/g, a packing density of 1.88 g/cm³, a compressive strength of 1.3 MPa and a particle size of 15-25 mm.

A preparation method of micron iron-based primary battery material includes the following steps:

Step 1: putting micron zero-valent iron particles (Micro-ZVI), micron activated carbon particles (Micro-GAC), bonding agent and tap water in a horizontal U-shaped mixer, mixing and stirring at 100 r/min for 7 min, and loading the micron zero-valent iron particles on the surface of the micron activated carbon particles by the bonding effect formed by crystals in the bonding agent to obtain a material composite; the bonding agents include a first bonding agent and a second bonding agent, the first bonding agent is one or two among sodium silicate and sodium metasilicate, the second bonding agent is one or two among calcium hydroxide and calcium carbonate, and when there are two bonding agents, the proportion between the two is any value; according to the mass volume ratio, micron zero-valent iron particles:micron activated carbon particles:first bonding agent:second bonding agent:deionized water=400 g/kg: 400 g/kg: 100 g/kg: 100 g/kg: 200 mL/kg; the first bonding agent is a mixture of sodium silicate and sodium metasilicate, and the mass ratio of the sodium silicate to the sodium metasilicate is 1:1; the second bonding agent is calcium carbonate;

Step 2: granulating the material composite in the Step 1 with a roller granulator at room temperature to obtain Micro-ZVI@GACs spherical particles with a particle size of 15-25 mm; the Micro-ZVI@GACs spherical particles are placed in the oven and dried at 55° C. for 10 h.

Embodiment 9

The raw materials of a micron iron-based primary battery material include micron zero-valent iron particles and micron activated carbon particles, and the primary battery material is spherical particles with a BET specific surface area of 50.6 m²/g, a packing density of 1.76 g/cm³, a compressive strength of 2.3 MPa and a particle size of 15-25 mm.

A preparation method of micron iron-based primary battery material includes the following steps:

Step 1: putting micron zero-valent iron particles (Micro-ZVI), micron activated carbon particles (Micro-GAC), bonding agent and tap water in a horizontal U-shaped mixer, mixing and stirring at 100 r/min for 7 min, and loading the micron zero-valent iron particles on the surface of the micron activated carbon particles by the bonding effect formed by crystals in the bonding agent to obtain a material composite; the bonding agent includes a first bonding agent and a second bonding agent, the first bonding agent is one or two kinds of sodium silicate and sodium metasilicate, the second bonding agent is one or two kinds of calcium hydroxide and calcium carbonate, and when the two, the proportion between is any value; according to the mass volume ratio, micron zero-valent iron particles:micron activated carbon particles:first bonding agent:second bonding agent:deionized water=400 g/kg: 400 g/kg: 100 g/kg: 100 g/kg: 200 mL/kg; the first bonding agent is a mixture of sodium silicate and sodium metasilicate, and the mass ratio of the sodium silicate to the sodium metasilicate is 1:1; the second bonding agent is calcium hydroxide;

Step 2: granulating the material composite in the Step 1 with a roller granulator at room temperature to obtain Micro-ZVI@GACs spherical particles with a particle size of 15-25 mm; the Micro-ZVI@GACs spherical particles are placed in the oven and dried at 55° C. for 10 h.

A membrane bioreactor system includes a water inlet tank 1, where the water outlet pipe of the water inlet tank 1 is communicated with the water inlet pipe of a water inlet pump 2, the water outlet pipe of the water inlet pump 2 is communicated with the water inlet pipe of an MBR reaction tank 20, and the signal input end of the water inlet pump 2 is connected with the signal output end of an automatic control system 19; the water outlet pipe of the medicament tank 3 is communicated with the water inlet pipe of the pH control pump 4, and the water outlet pipe of the pH control pump 4 is communicated with the water inlet pipe of the MBR reaction tank 20; the MBR reaction tank 20 is internally provided with a pH electrode 5, and the signal output end of the pH electrode 5 is connected with the signal input end of the automatic control system 19, and the signal output end of the automatic control system 19 is connected with the signal input end of the pH control pump 4; a liquid level controller 8 is arranged on the top side wall of the MBR reaction tank 20, the water inlet pipe of the liquid level controller 8 is communicated with the water outlet pipe of the MBR reaction tank 20, the signal output end of the liquid level controller 8 is connected with the signal input end of the automatic control system 19, the signal output end of the automatic control system 19 is connected with the signal input end of the water inlet pump 2, and the liquid level controller 8 includes a high liquid level sensor 9 and a low liquid level sensor 10. A fixing rod 11 is arranged at the top of the MBR reaction tank 20, and micron iron-based primary battery materials 6 connected in series are hung on the fixing rod 11; an air distribution pipe 13 is arranged at the bottom inside the MBR reaction tank 20 and extends to the outside of the MBR reaction tank 20, and a plurality of air distribution nozzles 14 are arranged at the top of the air distribution pipe 13 inside the MBR reaction tank 20 for injecting air into the MBR reaction tank 20; the pipeline of the air distribution pipe 13 outside the MBR reaction tank 20 is provided with a first gas flowmeter 15 for detecting the air flow in real time, and the signal output end of the first gas flowmeter 15 is connected with the signal input end of the automatic control system 19; one end of the air distribution pipe 13 is communicated with the air outlet pipe of the blower 12, and the signal output end of the automatic control system 19 is connected with the signal input end of the blower 12; a membrane module 7 perpendicular to the horizontal plane is arranged in the MBR reaction tank 20, the membrane module 7 is a hollow ceramic membrane, and the membrane module 7 is fixedly connected with the inner wall of the MBR reaction tank 20 through a plurality of clamping grooves; the water outlet pipe at the top of the membrane module 7 is communicated with the water inlet pipe of the suction pump 17, which is communicated with the water inlet pipe of the water outlet tank 18, and the signal input end of the suction pump 17 is connected with the signal output end of the automatic control system 19; the water inlet line of the suction pump 17 is provided with a second gas flowmeter 16 for detecting the air pressure of the water inlet line of the suction pump 17, and the signal output end of the second gas flowmeter 16 is connected with the signal input end of the automatic control system 19, which is connected with the signal input end of the suction pump 17.

The working principle of the membrane bioreactor system of the application is as follows.

The automatic control system 19 sends a water inlet instruction, turns on the water inlet pump 2, and transports the sewage in the water inlet tank 1 to the MBR reaction tank 20; the automatic control system 19 gives an instruction to the blower 12 to start the blower 12, and air is sprayed into the MBR reaction tank 20 through the air distribution nozzles 14 on the air distribution pipe 13, which on the one hand stirs the sewage in the MBR reaction tank 20, and on the other hand provides oxygen for microorganisms; during the reaction, the automatic control system 19 monitors the air flow entering the MBR reaction tank 20 through the first gas flowmeter 15. After the sewage enters the MBR reaction tank 20, the automatic control system 19 sends an instruction to the pH control pump 4, and the pH control pump 4 adds the acidic solution in the medicament tank 3 into the MBR reaction tank 20 to keep the pH of the liquid in the MBR reaction tank 20 at 8-8.5. The pH electrode 5 detects the pH value of the liquid in the MBR reaction tank 20 in real time and sends the detection signal to the automatic control system 19 to control the opening and closing of the pH control pump 4. The automatic control system 19 sends out a water outlet instruction, starts the suction pump 17, sucks the sewage degraded by the micron iron-based primary battery material 6 in the MBR reaction tank 20 into the ceramic membrane through the surface of the ceramic membrane of the membrane module 7, carries out mud-water separation through the interception function of the ceramic membrane, and discharges the degraded sewage to the water outlet tank 18; when the liquid level in the MBR reaction tank 20 is too high, the high liquid level sensor 9 feeds back a signal, and the automatic control system 19 sends a signal to the water inlet pump 2 to stop working, and at the same time sends a signal to the suction pump 17 to start the suction pump 17 to suck and drain water. When the liquid level in the MBR reaction tank 20 is too low, the low liquid level sensor 10 feeds back a signal, and the automatic control system 20 sends a signal to the suction pump 17 to stop working, and at the same time sends a signal to the water inlet pump 2, so that the water inlet pump 2 starts to feed water; when the air pressure of the second gas flowmeter 16 reaches 30 kPa, it means that the ceramic membrane in the membrane module 7 is polluted and needs to be cleaned in time. The optimal operating conditions of the system are: hydraulic retention time (HRT) is 8-24 h, sludge retention time (SRT) is 5-10 d, dissolved oxygen (DO) is 3-3.5 mg/L, pH value of liquid in MBR reaction tank 20 is 8-8.5, and mixed liquid suspended solids (MLSS) is 9.2-11.1 g/L.

Adding the micron iron-based primary battery material prepared by the application into the MBR reaction tank, zero-valent iron and activated carbon form a primary battery in the aqueous solution to generate a certain voltage, and the reaction process is as follows:

$$Fe^0 \rightarrow Fe^{2+} + 2e_{aq}, \varphi^0(Fe^{2+}/Fe^0) = -0.44V$$

$$Fe^{2+} \rightarrow Fe^{3+} + e_{aq}, \varphi^0(Fe^{3+}/Fe^{2+}) = -0.77V$$

$$e_{aq} + H_2O \rightarrow H + OH^-, \varphi^0(H^+/\bullet H) = 0$$

Under this voltage, oxygen competes as an electron acceptor, which can be reduced by •H to produce $H_2O_2$. The $H_2O_2$ produced in situ then reacts with ferrous ions ($Fe^{2+}$) to generate •OH. The reaction process is as follows:

$$2\bullet H + O_2 \rightarrow H_2O_2, \varphi^0(O_2/H_2O_2) = 0.68V$$

$$H_2O_2 + Fe^{2+} \rightarrow \bullet OH + Fe^{3+} OH^-$$

COD is degraded through chemical and biological coupling, and $H_2O_2$ and $Fe^{2+}$ produced in situ when micron iron-based primary battery materials meet water destroy the carbon chain of biodegradable organic matters, thus enhancing the organic degradation capability of the membrane bioreactor system.

The biological toxicity of water is significantly correlated with the concentration of toxic phenolic organic compounds (PHENs). Micron iron-based primary cells may enhance the biodegradation of PHENs by producing $Fe^{2+}$ and $Fe^{3+}$, thus reducing the biotoxicity of water treatment system. $Fe^{2+}/Fe^{3+}$ produced by micron iron-based primary battery materials in contact with water plays an important role in electron transfer chain and redox enzyme auxiliary group, and may also be used as the active center of many enzymes necessary for cell activities. For example, dehydrogenase may promote the dehydrogenation of organic compounds, which is an essential enzyme for the recycling of ubiquinone and nicotinamide adenine dinucleotide. Iron ions can promote the action of dehydrogenase and enhance the biodegradation of PHENs. The reaction process is as follows:

$$2H - R(\text{or} \cdot H) + UQ \xrightarrow{DeH} UQH_2 + R$$

$$2NAD + UQH_2 \rightarrow 2NADH + UQ$$

Where H-R is organic carbon; DeH is dehydrogenase; UQ is ubiquinone; NAD is nicotinamide adenine dinucleotide; and NADH is the reduced nicotinamide adenine dinucleotide.

The membrane bioreactor (MBR) system of the present application is used to treat the biodegradable organic industrial wastewater from a petrochemical plant, so as to efficiently remove phenols and other organic matters in the industrial organic wastewater and reduce its biotoxicity. The COD in the wastewater is 2,560-4,110 mg/L, TOC is 710-1,320 mg/L, the concentration of phenolic compounds is 525-1,005 mg/L, and the biodegradability $BOD_5/COD$ is 0.18-0.25. In this embodiment, the enhanced MBR system is a pilot-scale experimental device with a daily processing capacity of 48 liters. Micron iron-based primary battery materials are added into the MBR reaction tank according to the volume ratio of 10%, reaching a stable stage after 10 days of inoculation with activated sludge, and 4.8 liters (drainage volume) of micron iron-based primary battery materials are coupled into the MBR system (Micro-ZVI@GACs/MBR) after 68 days of stable operation, so as to detect the water quality in the effluent tank that reaches the stable stage after 11 days. At the same time, the control group is set up, and the operation process and parameters of the membrane biological reaction system are the same, except that micron iron-based primary battery materials are not added in the MBR reaction tank. The water quality parameters treated by the above sewage treatment system are shown in Table 1 below.

TABLE 1

Water quality indexes before and after adding micron iron-based primary battery materials

|  | Micro-ZVI@ GACs/MBR | MBR |
|---|---|---|
| Influent COD concentration (mg/L) | 2,923.5 | 3,012.0 |
| Effluent COD concentration (mg/L) | 183.8 | 737.1 |
| COD removal rate (%) | 93.7 | 75.5 |
| Influent TOC concentration (mg/L) | 1,004.2 | 1,099.1 |
| Effluent TOC concentration (mg/L) | 56.2 | 230.8 |
| TOC removal rate (%) | 94.4 | 77.4 |
| Influent PHENs concentration (mg/L) | 705.9 | 772.9 |
| Effluent PHENs concentration (mg/L) | 24.0 | 194.0 |
| PHENs removal rate (%) | 96.6 | 74.9 |
| Sludge average particle size (μm) | 753.0 | 338.0 |
| Average membrane fouling period (h) | 118.7 | 69.3 |

As may be seen from Table 1, after the micron iron-based primary battery material prepared by this application is added into the membrane bioreactor system to treat industrial organic wastewater, the degradation rates of COD, TOC and PHENs are increased by 18.2%, 21.7% and 17.0% respectively, which significantly improves the treatment efficiency of the membrane bioreactor system. Among them, the effluent COD and TOC are decreased to 183.8 mg/L and 56.2 mg/L respectively, which are lower than the discharge limits (COD≤200 mg/L and TOC≤60 mg/L) stipulated in China's Integrated Wastewater Discharge Standard (GB 8978-1996). Compared with the sludge particles produced by the membrane bioreactor system without micron iron-based primary battery materials, the sludge particles after sewage treatment by the membrane bioreactor system of the application become larger, and the pollution cycle of the ceramic membrane in the MBR reaction tank is obviously prolonged, which is 1.7 times that of the ceramic membrane without micron-sized iron-based primary battery materials, thus improving the running time of the membrane module, reducing the maintenance cost of the membrane bioreactor and further improving the economical performance of the membrane bioreactor.

TABLE 2

Concentration indexes of main membrane pollutants in water before and after adding micron iron-based primary battery materials

|  | Micro-ZVI@ GACs/MBR | MBR | Relative concentration change |
|---|---|---|---|
| EPS-Protein concentration (mg/L) | 6.41 | 6.8 | 5.70% |
| EPS-Polysaccharide concentration (mg/L) | 3.60 | 10.8 | 66.70% |
| SMP-Protein concentration (mg/L) | 32.66 | 44.8 | 27.10% |
| SMP-Polysaccharide concentration (mg/L) | 12.42 | 31.2 | 60.20% |

It may be seen from Table 2 that after the micron iron-based primary battery material prepared by the application is added into the membrane bioreactor system to treat industrial organic wastewater, $Fe^{3+}$ released from the micron iron-based primary battery material may inhibit the secretion of main membrane pollutants SMP and EPS protein, so the concentrations of EPS and SMP are reduced and the membrane fouling cycle is prolonged.

TABLE 3

Biological toxicity of water quality before and after adding micron iron-based primary battery materials

|  | 15 min Acute biotoxicity | Specific oxygen consumption rate (mgO$_2$/gMLVSS * h) |
|---|---|---|
| AS | 17.50% | 1.8 |
| AS: ZVI@GACs = 1:0.05 | 0.10% | 2.5 |
| AS: ZVI@GACs = 1:0.1 | −10.50% | 3.3 |
| AS: ZVI@GACs = 1:0.2 | −12% | 2.7 |

As may be seen from Table 3, after the micron iron-based primary battery material prepared by the application is added into the membrane bioreactor system to treat industrial organic wastewater, the biological toxicity of the mixed liquor in the MBR reaction tank decreases with the increase of the content of the micron iron-based primary battery material, and the specific oxygen consumption rate increases, thus significantly improving the biological activity of activated sludge (AS).

What is claimed is:

1. A preparation method of a micron iron-based primary battery material, wherein:
    raw materials of the primary battery material comprise micron zero-valent iron particles and micron activated carbon particles, wherein the micron zero-valent iron particles have a purity of greater than 90% and a particle size is of 15-25 μm, and the micron activated carbon particles have a specific surface area more than 800 m$^2$/g, and a particle size of 50-100 μm;

the micron-sized zero-valent iron particles are loaded on a surface of the micron-sized activated carbon particles by adhesion using a bonding agent;

the resulting mixture is stirred, granulated, and dried to obtain spherical micron iron-based primary battery materials; the spherical particles have a BET specific surface area of the spherical particles is 32-110 m$^2$/g, and a particle size is 15-25 mm; and the bonding agent comprises a first bonding agent and a second bonding agent, wherein the first bonding agent is one or a combination of sodium silicate and sodium metasilicate, and the second bonding agent is one or a combination of calcium hydroxide and calcium carbonate.

2. The preparation method according to claim 1, wherein the mass volume ratio of the micron zero-valent iron particles:the micron activated carbon particles:the first bonding agent:the second bonding agent:deionized water is 350-450 g/kg: 350-450 g/kg: 50-150 g/kg: 50-150 g/kg: 200 mL/kg.

3. The preparation method according to claim 1, wherein a speed of the stirring is 80-120 r/min for 5-9 minutes; a temperature of the drying is 50-60° C. for 8-12 h.

* * * * *